US011785068B2

(12) United States Patent
Petrovic et al.

(10) Patent No.: US 11,785,068 B2
(45) Date of Patent: Oct. 10, 2023

(54) ARTIFICIAL INTELLIGENCE IMAGE FRAME PROCESSING SYSTEMS AND METHODS

(71) Applicant: SYNAPTICS INCORPORATED, San Jose, CA (US)

(72) Inventors: Vladan Petrovic, San Jose, CA (US); Utkarsh Gaur, San Jose, CA (US); Pontus Lidman, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/139,905

(22) Filed: Dec. 31, 2020

(65) Prior Publication Data

US 2022/0210213 A1 Jun. 30, 2022

(51) Int. Cl.
| | | |
|---|---|---|
| *H04L 65/70* | (2022.01) | |
| *H04N 21/2662* | (2011.01) | |
| *G06N 3/08* | (2023.01) | |
| *H04N 21/258* | (2011.01) | |
| *H04L 65/403* | (2022.01) | |
| *H04N 21/24* | (2011.01) | |
| *H04L 65/75* | (2022.01) | |

(52) U.S. Cl.
CPC ............... *H04L 65/70* (2022.05); *G06N 3/08* (2013.01); *H04L 65/403* (2013.01); *H04L 65/75* (2022.05); *H04N 21/2402* (2013.01); *H04N 21/25825* (2013.01); *H04N 21/2662* (2013.01)

(58) Field of Classification Search
CPC ....... G06N 3/08; H04L 65/403; H04L 65/601; H04L 65/607; H04N 21/2402; H04N 21/25825; H04N 21/2662
See application file for complete search history.

(56) References Cited

U.S. PATENT DOCUMENTS

| | | | |
|---|---|---|---|
| 10,574,537 B2 | 2/2020 | Kuo et al. | |
| 10,601,889 B1* | 3/2020 | Doron | H04L 65/65 |
| 10,643,306 B2 | 5/2020 | Hwang et al. | |
| 10,970,830 B2 | 4/2021 | Zhang et al. | |
| 2003/0031258 A1* | 2/2003 | Wang | H04N 19/127 |
| | | | 375/240.26 |
| 2006/0088105 A1 | 4/2006 | Shen et al. | |
| 2007/0189390 A1* | 8/2007 | Pappas | H04N 19/51 |
| | | | 375/E7.123 |

(Continued)

*Primary Examiner* — Dhairya A Patel
(74) *Attorney, Agent, or Firm* — Paradice & Li LLP

(57) ABSTRACT

Systems and method for streaming video content include downscaling video content using a downscaling model to generate downscaled video content and downloading the downscaled video content as a video stream and corresponding upscaling model to a client device. The system converts received video frames to a video memory format comprising channels having the same memory allocation size, each subsequent channel arranged in an adjacent memory location, for input to the downscaling model. The client device upscales the video stream using the received upscaling model for display by the client device in real-time. A training system trains the downscaling model to generate the downscaled video content, based on associated metadata identifying a type of video content. The downscaled video content and associated upscaling models are stored for access by an edge server, which downloads upscaling models to a client device to select an upscaling model.

16 Claims, 6 Drawing Sheets

(56) References Cited

U.S. PATENT DOCUMENTS

| | | | |
|---|---|---|---|
| 2008/0140380 A1* | 6/2008 | Marsyla | G06F 9/451 703/26 |
| 2008/0285650 A1* | 11/2008 | Chappalli | H04N 7/0132 375/240.16 |
| 2010/0005494 A1* | 1/2010 | McLean | G11B 27/3027 725/58 |
| 2012/0026277 A1 | 2/2012 | Malzbender et al. | |
| 2012/0274856 A1* | 11/2012 | Kumar | G09G 5/14 348/E5.108 |
| 2013/0301726 A1* | 11/2013 | Hung | H04N 19/43 375/240.16 |
| 2014/0237083 A1 | 8/2014 | Astudillo et al. | |
| 2015/0092843 A1* | 4/2015 | Millet | H04N 19/423 375/240.12 |
| 2015/0304390 A1 | 10/2015 | Chakarapani et al. | |
| 2016/0292510 A1 | 10/2016 | Han et al. | |
| 2016/0345066 A1 | 11/2016 | Barker et al. | |
| 2017/0164009 A1* | 6/2017 | Decegama | H04N 7/12 |
| 2017/0187811 A1 | 6/2017 | Thomée | |
| 2018/0183998 A1 | 6/2018 | Menachem et al. | |
| 2018/0189641 A1 | 7/2018 | Boesch et al. | |
| 2018/0350326 A1* | 12/2018 | Kanumuri | H04N 19/426 |
| 2019/0066257 A1 | 2/2019 | Daga et al. | |
| 2019/0082185 A1 | 3/2019 | Satavalekar et al. | |
| 2019/0220746 A1* | 7/2019 | Liu | G06N 3/04 |
| 2019/0373283 A1* | 12/2019 | Lindberg | H04N 19/186 |
| 2020/0016027 A1 | 1/2020 | Kim et al. | |
| 2020/0126187 A1 | 4/2020 | Park et al. | |
| 2020/0162789 A1 | 5/2020 | Ma et al. | |
| 2020/0192420 A1* | 6/2020 | Irshad | G09G 5/39 |
| 2020/0219233 A1 | 7/2020 | Park et al. | |
| 2020/0314480 A1 | 10/2020 | Gupta et al. | |
| 2020/0314481 A1 | 10/2020 | Gupta et al. | |
| 2020/0327334 A1* | 10/2020 | Goren | G06V 40/165 |
| 2020/0410318 A1 | 12/2020 | Del Mundo et al. | |
| 2021/0076016 A1* | 3/2021 | Sviridenko | G06T 9/002 |
| 2021/0097646 A1 | 4/2021 | Choi et al. | |
| 2021/0168405 A1 | 6/2021 | Hsiao et al. | |
| 2021/0279938 A1 | 9/2021 | Chandran et al. | |
| 2021/0287404 A1* | 9/2021 | Chang | H04N 19/12 |
| 2021/0306636 A1 | 9/2021 | Bae et al. | |
| 2022/0281005 A1* | 9/2022 | Kandasamy | B21C 25/04 |

* cited by examiner

ARTIFICIAL INTELLIGENCE IMAGE FRAME PROCESSING SYSTEMS AND METHODS

TECHNICAL FIELD

The present disclosure relates generally to video, audio and related media delivery pipelines. More specifically, for example, embodiments of the present disclosure relate to systems and method for efficient sub-sampling and up-sampling of video or image content using artificial intelligence.

BACKGROUND

Video streaming services and applications provide on-demand delivery of video, audio and other media content to client devices. In some systems, a content provider delivers movies, television shows and other video content to client subscribers. The client subscribers may operate different devices, from different locations, across a variety of different network connections types and bandwidths. Video streaming services thus face a challenge in delivering high quality content to each client subscriber. One approach to efficiently delivering high quality media uses artificial intelligence to upscale media content in a media pipeline. In this manner, a compressed, downscaled media stream is delivered allowing for efficient use of available bandwidth and then upscaled using artificial intelligence super-resolution processing by the client subscriber to provide a high-quality image for display.

In view of the foregoing, there is a continued need in the art for improved media pipelines, including hardware and software components, to efficiently process input and output frames using artificial intelligence, such as artificial intelligence super-resolution processing.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, wherein showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Various embodiment of systems and methods for efficiently processing media streams are disclosed herein. Current multimedia processor chips support various pixel formats for consumption by a standard multimedia processing pipeline (e.g., YUV444 or YUV420 with semi-planar or packed memory layout). However, supported memory layouts for sub-sampled pixel formats (e.g., YUV420) are not optimized for consumption by the artificial intelligence (AI) algorithms. In the present disclosure, systems and methods are disclosed including a novel pixel format and memory layout that allows input channels to be of the same size and adjacent in memory for more efficient AI processing.

Figure 1:
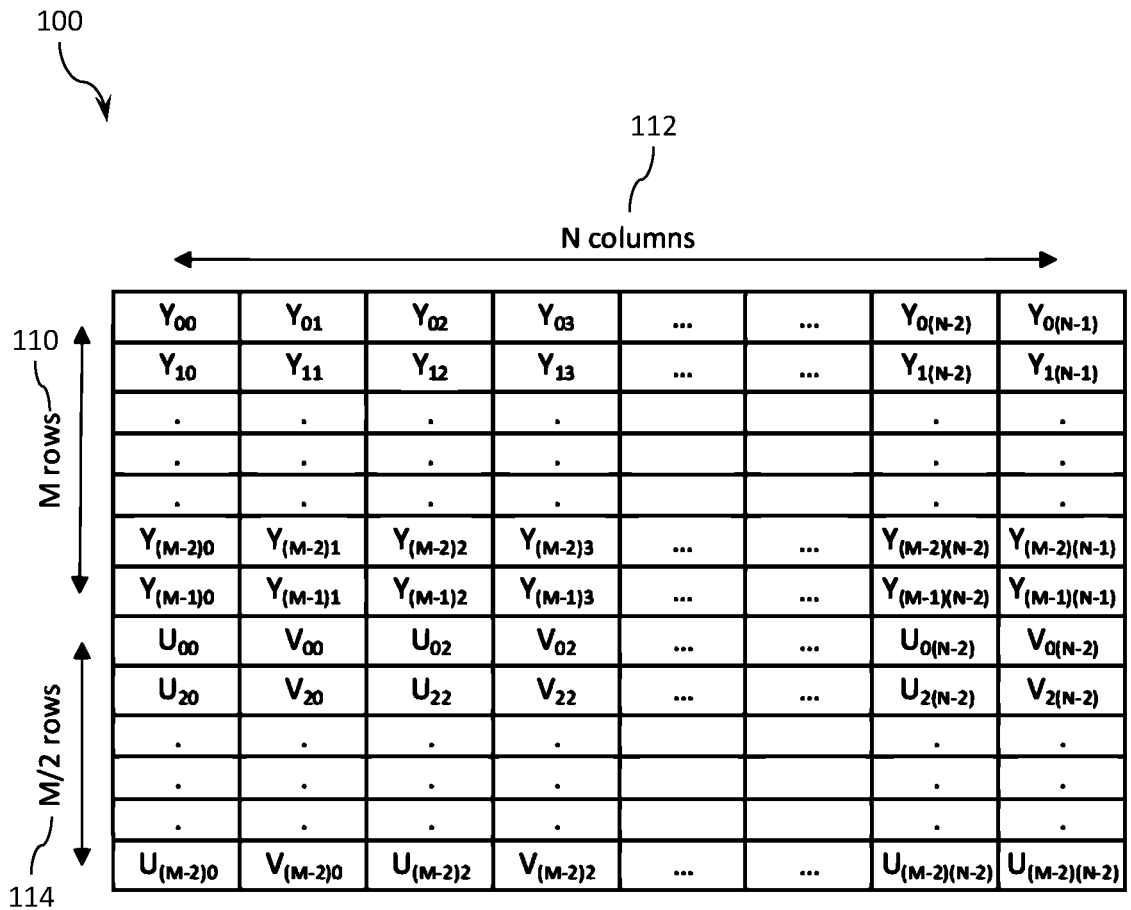
FIG. 1 is a diagram illustrating a conventional YUV420 memory layout, in accordance with one or more embodiments of the present disclosure.

A conventional memory layout 100 for chroma sub-sampled YUV420 format is shown in FIG. 1. In this format the luma (Y) channel is stored in full resolution having M×N pixels, where M is the image height 110 and N is the image width 112. Chroma (U and V) channels are subsampled and both have $$\frac{M}{2} \times \frac{N}{2}$$

pixels (quarter resolution). Pixels of chroma channels 114 are stored adjacent in memory as illustrated.

In various embodiments, the stored sub-sampled image frames are input to a neural network process that receives input tensors and produces output tensors that may have different number of channels having the same spatial dimensions. One way to make all input channels of the same spatial dimensions is to up-sample the chroma channels using an interpolation method (e.g., bilinear or bicubic). This will create more data, but the amount of information will remain the same. In another approach, the system can down-sample the luma channel after anti-aliasing filtering (e.g., bilinear or bicubic). Using this approach will lose some information, such as high frequency components in the image.

Figure 2:
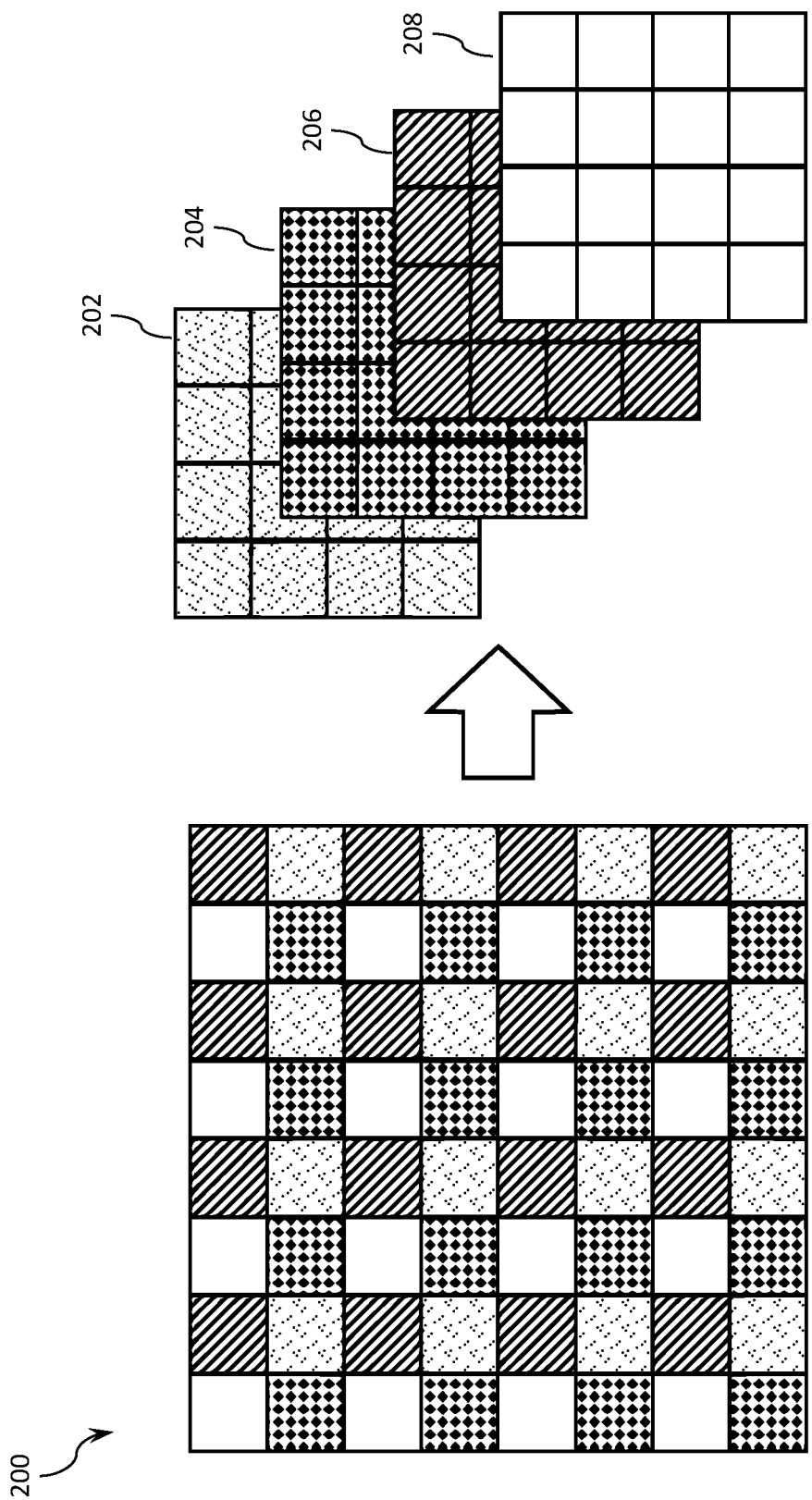
FIG. 2 illustrates an example extraction of down-sampled luma components, in accordance with one or more embodiments.

In one embodiment of the present disclosure, a system takes each of the four 2× down-sampled phases of the luma channel 200 (e.g., without any filtering) and puts them into separate channels as illustrated in FIG. 2. These four channels 202 204, 206 and 208 are then stacked together with chroma channels to form a 6-channel tensor. This approach preserves the information in the luma channel and all the channels will be of equal spatial dimensions while preserving the same amount of data. This approach allows the format to be easily read and readily consumable by a neural network algorithm. From the neural network processing perspective, the channels can be ordered in memory either in channels first (e.g., planar) format or in channels last (e.g., packed) format.

Figure 3:
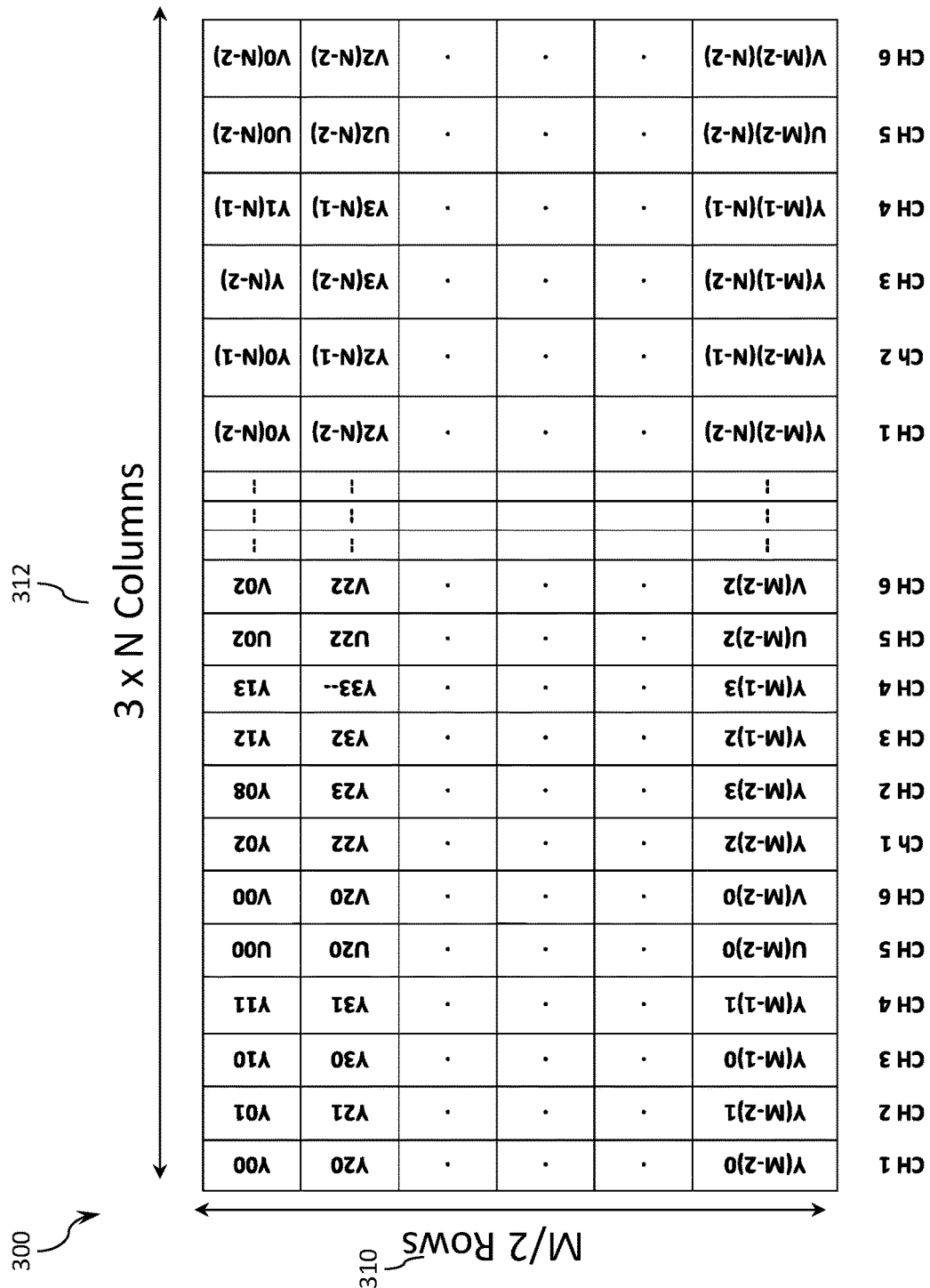
FIG. 3 illustrates an example YUV memory layout for artificial intelligence frame processing, in accordance with one or more embodiments.
Figure 4:
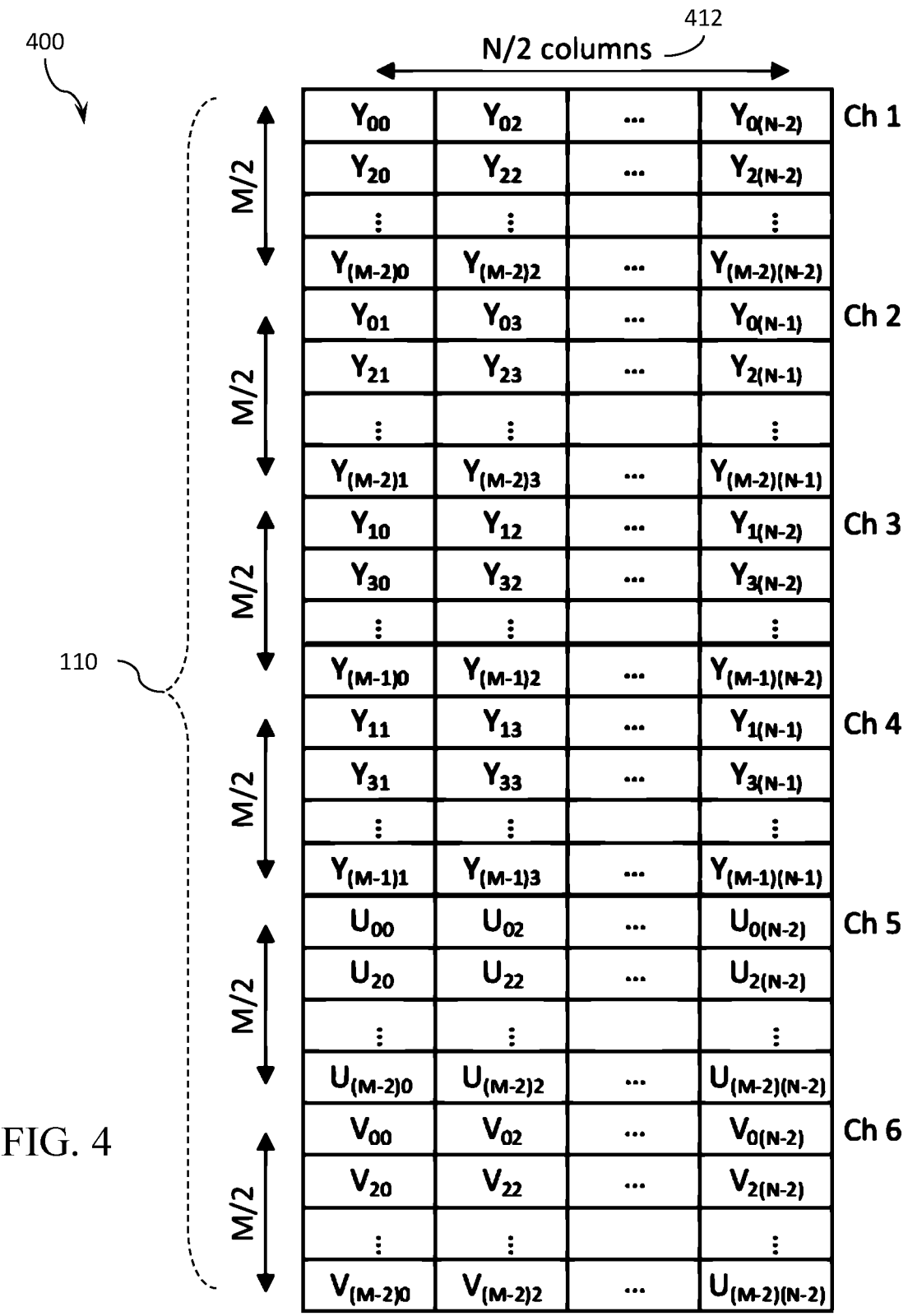
FIG. 4 illustrates an YUV memory layout with channels first ordering, in accordance with one or more embodiments.

FIGS. 3 and 4 illustrate embodiments of novel YUV memory layouts with channels first and channels last ordering, respectively, are illustrated. In both cases we have a tensor with height of $$\frac{M}{2}$$

pixels, width of $$\frac{N}{2}$$

pixels, and 6 channels as the input to the subsequent neural network processing. In various embodiments, the neural network processing may be performed by specialized hardware and software such as a neural processing unit (NPU) in a multimedia processing system.

Referring to FIG. 3, a YUV memory layout 300 with channels first ordering will now be described in accordance with one or more embodiments. The YUV memory layout 300 arranges an image frame in rows 310 and columns 312 using a 3×N column by M/2 row memory configuration, where M is the image height and N is the image width. As illustrated, the memory layout 300 for a frame comprises 4 columns for the luminance component (channels 1-4), and one column for each of the chrominance components (channels 5-6), that repeat for a total of 3×N columns. Referring to FIG. 4, a YUV memory layout 400 with channels last ordering is illustrated. The YUV memory layout 400 arranges an image frame in rows 410 and columns 412 using an N/2 column by 6×M/2 row memory configuration. As illustrated, each column includes 4 M/2 luminance components and a pair of M/2 chrominance components (for chrominance components U and V).

While the illustrated embodiments describe a novel memory layout for the YUV420 pixel format, a similar approach can be applied to other chroma sub-sampled formats (e.g., YUV422 or YUV440). Using the memory layout of the present disclosure, the input/output tensors improve the efficiency of deep learning neural networks and neural network accelerators. Conventional hardware blocks are configured to perform color pixel format conversion as a part of a standard processing pipeline. Having an option to produce an appropriate pixel format for artificial intelligence processing saves cycles that software would otherwise have to spend on format conversion, while reducing latency. This approach is suited for complex tasks such as AI super-resolution with large input and output frame sizes.

Figure 5:
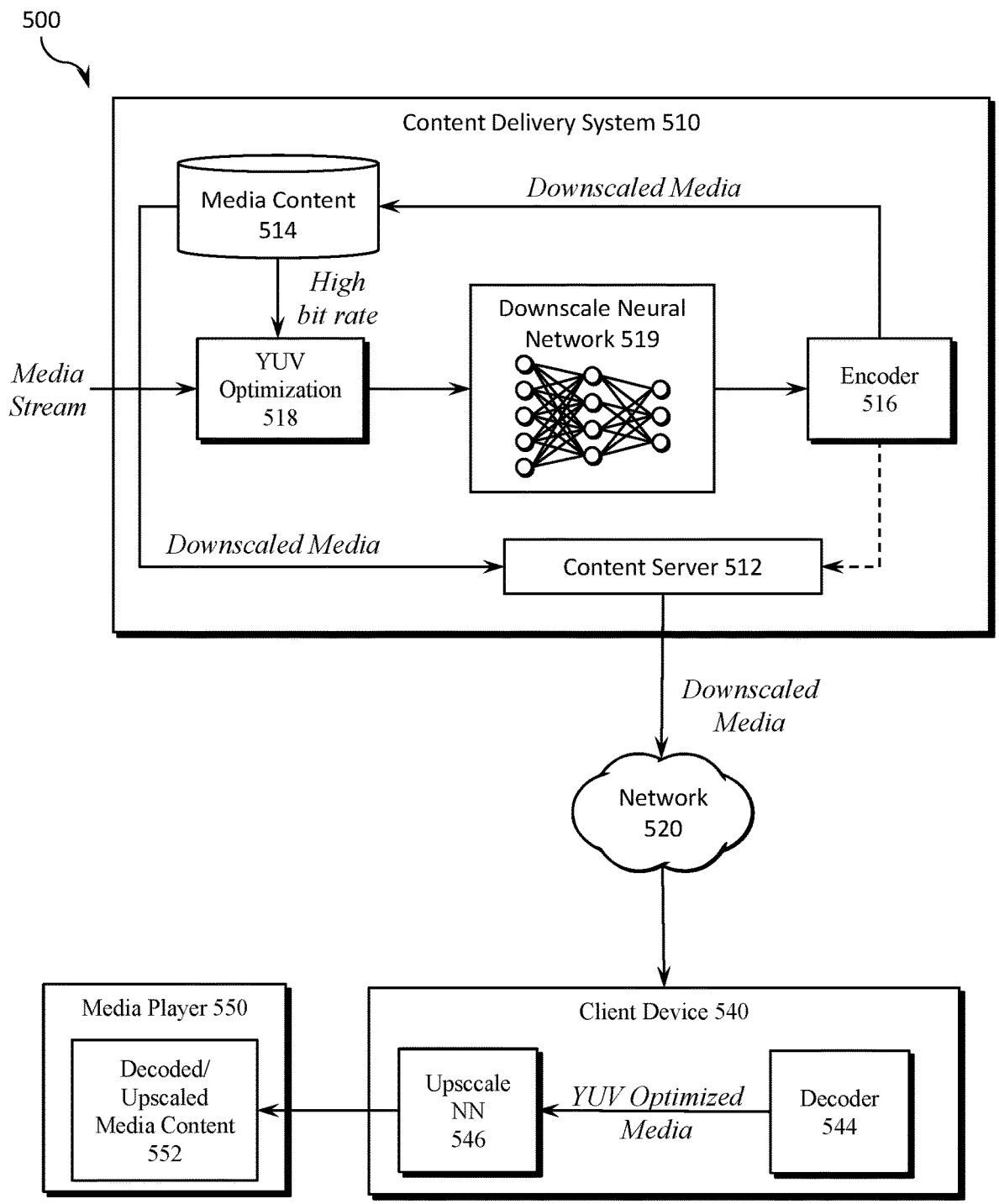
FIG. 5 illustrates an example content delivery system, in accordance with one or more embodiments.

Embodiments of systems and methods using the AI memory layout of the present disclosure will now be described with reference to FIGS. 5-7. Referring to FIG. 5, an example content distribution network 500 will now be described in accordance with one or more embodiments of the present disclosure. The content distribution network 500 includes a content delivery system 510 including one or more content servers 512 configured to deliver downsampled media content to one or more client devices 540.

The content delivery system 510 further includes media content storage 514 for storing video and other media content for distribution by the content distribution network 500, and neural network scaling components for downscaling media for delivery. The content server 512 is communicably coupled to the client device 540 through a network 520, which may include one or more wired and/or wireless communication networks, edge servers, the Internet, cloud services, and/or other network components. The content delivery system 510 is configured to store video content, including audio data, video data and other media data, in content storage 514, which may include one or more databases, storage devices and/or storage networks. In some embodiments, the media content is received as media stream (e.g., a livestream) and is processed through the content delivery system 510 in real time.

In some embodiments, the network 520 includes optional edge servers configured to receive media content and neural network scaling models from the content server 512 and stream the media content and deliver the neural network scaling models to the client device 540. The edge servers may be geographically distributed to provide media services to regional client devices across regional networks. The client devices 540 may access content on any number edge servers connected through the network 520.

FIG. 5 illustrates one example embodiment of a content delivery network. Other embodiments may include more elements, less elements and/or different elements and various components described herein may be distributed across multiple devices and/or networks, and/or combined into one or more devices as desired.

In operation, the content delivery system 510 receives media content and encodes the media content for delivery to client devices through one or more media encoders 516 (e.g., MP4 encoding, advanced video coding (AVC), or other media coding format). The encoding process may include training one or more neural networks 519 to scale the media content, allowing for a single media file to be delivered to a client device along with trained neural network scaling models. In some embodiments, upscale neural network models and downscale neural network models may be trained to accommodate different communications bandwidths, processing resources and display resolutions associated with each client device 550. As illustrated, media content is provided to a YUV optimization block 518 to process frames of the media content (e.g., into the YUV memory formats disclosed in FIG. 3 or FIG. 4) for input to the downscale neural network 519 for encoding through encoder 516 for delivery to the client device 540 (and/or storage in media content storage 514 for later delivery).

The client device 540 includes or is connected to a video display and/or audio output resources depicted as a media play 550. A user may access an application on the client device 550 to select and stream media content 514 available for streaming. The client device 550 retrieves the neural network model associated with the media content to process received media content. The client device 540 is configured to decode streamed media content using decoder 544 to generate the YUV optimized media, which is in a memory format optimized for neural network processing. The YUV optimized media is upscaled by upscale neural network 546 and provided to media player 550 for display/playback as decoded/upscaled media content 552. In various embodiments, the client device 550 may include a personal computer, laptop computer, tablet computer, mobile device, a video display system, or other device configured to receive and play media content as described herein. The systems and methods described herein reduce bandwidth requirements for delivering the media content and increase streaming efficiency.

In various embodiments, the resolution of the encoded/downscaled media content is selected to optimize video quality using available bandwidth between content server 512 and the client device 540. In some cases, however, the bandwidth may be reduced/degraded at various times (e.g., higher than normal network traffic, network or device failures or maintenance, etc.). To accommodate low bandwidth scenarios, the content delivery system 510 may be configured to provide a plurality of downscaling and upscaling neural networks to accommodate various bandwidth constraints by reducing the file size of the streaming media.

Figure 6:
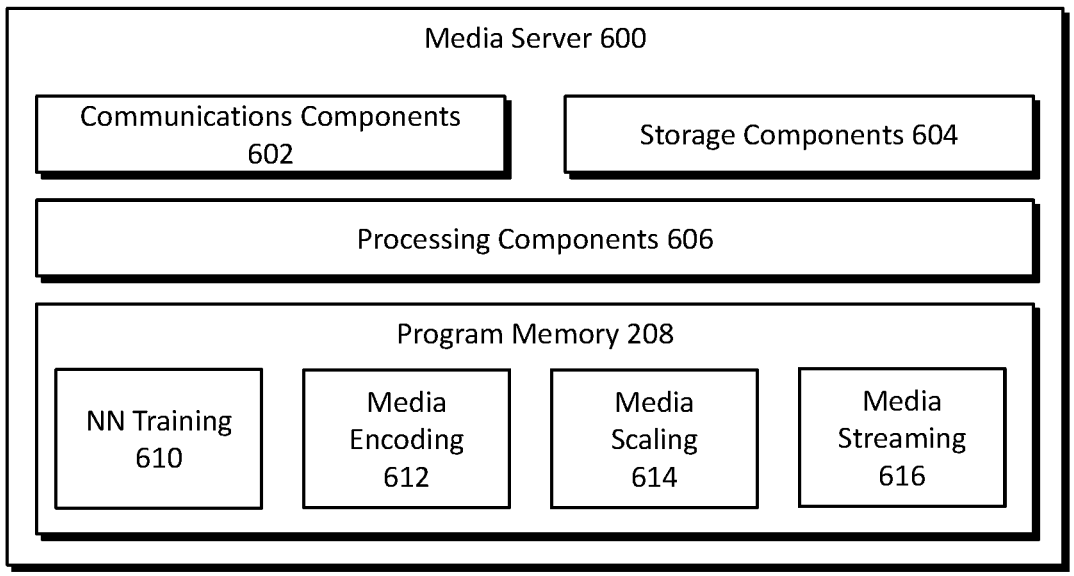
FIG. 6 illustrates an example media server, in accordance with one or more embodiments.

FIG. 6 illustrates example media server components that may be implemented in one or more physical devices of a content delivery network, in accordance with one or more embodiments. As illustrated, media server 600 includes communications components 602, storage components 604, processing components 606 and program memory 608. The media server 600 may represent any type network video server configured to perform some or all of the processing steps disclosed herein. The components illustrated in FIG. 6 may be implemented as a standalone server, may be distributed among a plurality of different devices, and may include additional components.

Processing components 606 may be implemented as any appropriate processing device (e.g., logic device, microcontroller, processor, application specific integrated circuit (ASIC), a field programmable gate array (FPGA), or other device) that may be used by media server 600 to execute appropriate instructions, such as software instructions stored in program memory 608, which include neural network training components 610, media encoding components 612, media scaling components 614, and media streaming components 616.

The program memory 208 may include one or more memory devices (e.g., memory components) that store data and information, including image data (e.g., including thermal imaging data), audio data, network information, camera information, and/or other types of sensor data, and/or other monitoring information. The memory devices may include various types of memory for information storage including volatile and non-volatile memory devices, such as RANI (Random Access Memory), ROM (Read-Only Memory), EEPROM (Electrically-Erasable Read-Only Memory), flash memory, a disk drive, and other types of memory described herein. In some embodiments, processing components 606 are configured to execute software instructions stored in memory program memory 608 to perform various methods, processes, or operations described herein. Storage components 604 may comprise memory components and mass storage devices such as storage area network, cloud storage, or other storage components configured to store media content and neural network information.

Communications components 602 may include circuitry or other components for communicating with other devices using various communications protocols. For example, communications components 602 may include wireless and/or wireless communications components such as components that generate, receive, and/or process communications signals over one or more networks such as a cellular network, the Internet, or other communications network. The communications components 602 may be used to receive media content for streaming to one or more client devices. The media content may include video streams and files that are compressed such as with industry standard video compression formats which may include MPEG-2, MPEG-4, H.263, H.264, and MJPEG standards to reduce network bandwidth, use of image processing resources, and storage.

Figure 7:
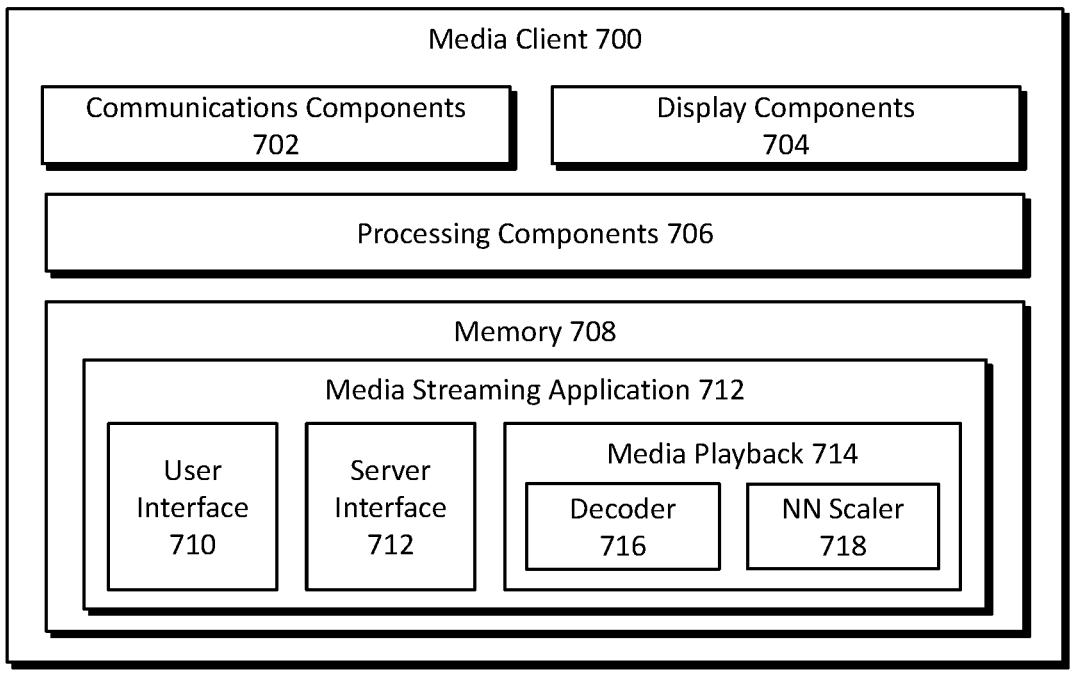
FIG. 7 illustrates an example media client, in accordance with one or more embodiments.

Referring to FIG. 7, example components of a media client 700 will now be described, in accordance with one or more embodiments of the present disclosure. The media client 700 is configured to access the media server 7700 across a network to receive and process a stream of media content. The media client 700 includes communications components 702, display components 704, processing components 706, and memory components 708. The processing components 706 may include logic devices, microcontrollers, processors, application specific integrated circuits (ASICs), field programmable gate arrays (FPGAs) or other devices that may be used by media client 700 to execute appropriate instructions, such as software instructions stored in memory 708.

The media client 700 is configured to execute a media streaming application 712 stored in the memory 708. The media streaming application 712 may include a user interface 710 allowing a user to interface with the media server and select media for playback on the media client 700, an edge server interface 712 configured to facilitate communications between the media client 700 and a media server 600, and media playback modules 714 to receive the streamed media content and prepare the media for output on the display components 704 (e.g., a television, a computer monitor with speakers, a mobile phone, etc.). The media playback module 714 may include a decoder 716 for decoding and uncompressing the received video stream and a neural network scaler 718 configured to upscale the received media content for playback on the media client 700.

A person skilled in the art will recognize that the systems and methods disclosed herein are not limited to an on-demand media content streaming service and may be applied to other applications where streaming media is used. For example, a video conferencing system may use scaling neural networks for communicating between two or more client devices using the YUV memory optimization of the present disclosure.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure.

Various embodiments provided herein can be implemented using hardware, software, or combinations of hardware and software, and various hardware and software components can be combined into one or more components comprising a combination of software and/or hardware, without departing from the spirit of the present disclosure. Where applicable, the ordering of various steps described herein can be changed, combined into composite steps, and/or separated into sub-steps to provide features described herein.

Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for streaming video content comprising:
converting received video frames to a video memory format comprising a plurality of channels representing a color space, wherein each of the plurality of channels has the same memory allocation size and is associated with a respective luma component or chroma component of the color space, wherein each subsequent channel of the plurality of channels is arranged in an adjacent memory location, and wherein the video memory format for an N×M video frame of the received video frames comprises 3×N columns and M/2 rows;
downscaling the video frames stored in the video memory format using a downscaling neural network model to generate downscaled video content; and
transmitting the downscaled video content as a video stream to a client device.

2. The method of claim 1, further comprising training the downscaling neural network model to generate the downscaled video content.

3. The method of claim 1, wherein the downscaled video content includes associated metadata identifying a type of video content, and wherein the downscaling neural network model is trained to generate the downscaled video content for the type of video content.

4. The method of claim 1, wherein the downscaled video content and one or more upscaling models associated with the downscaled video content are stored for access by an edge server, and wherein transmitting the downscaled video content as the video stream and the one or more upscaling models associated with the downscaled video content is performed by the edge server.

5. The method of claim 4, wherein the edge server transmits a plurality of upscaling models to the client device, and wherein the client device is configured to select an upscaling model for use by the client device.

6. The method of claim 1, wherein the method is performed by a video streaming system.

7. The method of claim 1, further comprising initiating a video conferencing session.

8. A system comprising:
a processor; and
a memory storing instructions that, when executed by the processor, cause the system to:
convert received video frames to a video memory format comprising a plurality of channels representing a color space, wherein each of the plurality of channels has the same memory allocation size and is associated with a respective luma component or chroma component of the color space, wherein each subsequent channel of the plurality of channels is arranged in an adjacent memory location, and wherein the video memory format for an N×M video frame of the received video frames comprises 3×N columns and M/2 rows;
downscale the video frames stored in the video memory format using a downscaling neural network model to generate downscaled video content; and
transmit the downscaled video content as a video stream to a client device.

9. The system of claim 8, wherein execution of the instructions further causes the system to:
transmit the downscaled video content and an upscaling model associated with the downscaled video content to an edge server.

10. The system of claim 9, wherein execution of the instructions further causes the system to generate the upscaling model.

11. The system of claim 10, wherein execution of the instructions further causes the system to:
detect a video content type and train the upscaling model to optimize upscaling of video for the video content type.

12. The system of claim 10, wherein execution of the instructions further causes the system to:
train a downscale model to receive video content; and
generate the downscaled video content for streaming.

13. The system of claim 8, wherein the video content includes associated metadata identifying a type of video content, and wherein the downscaling neural network model is trained to generate the downscaled video content for the type of video content.

14. The system of claim 8, wherein an edge server is configured to transmit a plurality of upscaling models to the client device, and wherein the client device is configured to select an upscaling model for use by the client device in preparing the video stream for display.

15. The system of claim 8, wherein the system is a video streaming system.

16. The system of claim 8, wherein the system is a video conferencing session.

* * * * *